United States Patent
Schröter

[19]

[11] Patent Number: 6,131,950
[45] Date of Patent: Oct. 17, 2000

[54] KNEE RESTRAINT DEVICE FOR VEHICLES

[75] Inventor: Rainer Schröter, Reichertshausen, Germany

[73] Assignee: TRW Occupant Restraint Systems GmbH, Alfdorf, Germany

[21] Appl. No.: 09/024,363

[22] Filed: Feb. 17, 1998

[30] Foreign Application Priority Data

Feb. 18, 1997 [DE] Germany ............... 297 02 797 U

[51] Int. Cl.⁷ .................................................. B60R 21/04
[52] U.S. Cl. .................... 280/753; 280/730.1; 280/752
[58] Field of Search .................................. 280/753, 751, 280/752, 728.2, 728.3, 730.1, 732, 743.2

[56] References Cited

U.S. PATENT DOCUMENTS

| | | | |
|---|---|---|---|
| 3,784,223 | 1/1974 | Hass et al. ............................ | 280/730.1 |
| 3,966,227 | 6/1976 | Cameron ................................. | 280/752 |
| 5,335,939 | 8/1994 | Kuriyama et al. .................... | 280/728.3 |
| 5,458,366 | 10/1995 | Hock et al. ............................. | 280/729 |
| 5,536,043 | 7/1996 | Lang et al. ............................. | 280/753 |
| 5,544,911 | 8/1996 | Vine ........................................ | 280/728.2 |
| 5,570,905 | 11/1996 | Dyer ....................................... | 280/743.2 |
| 5,630,621 | 5/1997 | Schneider ............................... | 280/753 |
| 5,816,613 | 10/1998 | Specht et al. .......................... | 280/753 |

FOREIGN PATENT DOCUMENTS

| | | |
|---|---|---|
| 0684164 | of 0000 | European Pat. Off. . |
| 29611869 | of 0000 | Germany . |
| 3908713 | of 0000 | Germany . |

*Primary Examiner*—J. J. Swann
*Assistant Examiner*—David R. Dunn
*Attorney, Agent, or Firm*—Tarolli, Sundheim, Covell, Tummino & Szabo L.L.P.

[57] ABSTRACT

A knee restraint device for vehicles comprises a knee protector plate movable in the direction of the knees of a vehicle occupant, a base plate connectable to a vehicle structure having at least one opening for connection to a gas generator and a wall of flexible material folded between said base plate and said knee protector plate in the resting condition. Said wall is connected along a first closed rim to said base plate and along a second closed rim to said knee protector plate. To control the movement path of the knee protector plate during the inflation action a first edge of said knee protector plate oriented in the vehicle transverse direction is held swivable and releasable on said base plate and a second edge of said knee protector plate located opposite said first edge is secured to said base plate by a fastener which releases on activation of said gas generator due to the expansion pressure of said wall being deployed. The fastener releases before said knee protector plate has swivelled about its first edge and has been subsequently released from said base plate.

11 Claims, 4 Drawing Sheets

KNEE RESTRAINT DEVICE FOR VEHICLES

The invention relates to a knee restraint device for vehicles, comprising a knee protector plate movable in the direction of the knees of a vehicle occupant, a base plate connectable to a vehicle structure having at least one opening for connection to a gas generator, and a wall of flexible material folded between the base plate and the knee protector plate in the resting condition, this wall being connected along a first closed rim to the base plate and along a second closed rim to the knee protector plate.

BACKGROUND OF THE INVENTION

A knee restraint device of this kind is known from German utility model specification No. 296 11 869.9. The knee restraint device described therein comprises a knee protector plate which is movable in the direction of the knees of a vehicle occupant. Such knee restraint device are needed since the restraint effect attainable by an inflatable gas cushion in the region of the upper trunk of a vehicle occupant is insufficient in the case of a vehicle collision if the body of the vehicle occupant fails to be additionally restrained by a fastened seat belt. Since freedom of movement would be restricted by knee cushions rigidly incorporated in the vehicle, movable knee cushions are made use of, which are shifted into place in the direction of the knees of the vehicle occupant by a gas bag being instantly inflated should the vehicle be involved in a head-on collision. This gas bag is formed by a base plate connected to the vehicle structure, this base plate having at least one opening for connecting a gas generator, and a wall of flexible material folded between the base plate and the knee protector plate in the resting condition, connected along a first closed rim to the base plate and along a second closed rim to the knee protector plate. Such a design may be provided optionally since it is not integrated in the vehicle structure. Whilst knee restraint devices of this kind feature adequate protection when the vehicle occupant is correctly seated, problems arise in this respect should the vehicle occupant not be correctly seated in the vehicle seat. Since prior art knee restraint devices cannot be controlled in their movement sequence during inflation, the position of the knee protector plate may be so unfavourable that the desired protection fails to be achieved should knee impact of the vehicle occupant occur too early.

SUMMARY OF THE INVENTION

By means of the knee restraint device in accordance with the invention, control of the movement path of the knee protector plate during inflation action is made possible. The movement of the knee protector plate is controlled during the inflation action so that adequate protection is provided even if knee impact of the vehicle occupant occurs prior to the final position being attained.

For this purpose in a knee restraint device of the type concerned a first edge of the knee protector plate oriented in the vehicle transverse direction is held swivable and releasable on the base plate. A second edge of the knee protector plate located opposite the first edge is secured to the base plate by a fastener which is able to be torn out which releases on activation of the gas generator due to the expansion pressure of the wall being deployed before the knee protector plate has swivelled about its first edge. Subsequently the first edge of the knee protector plate is released from the base plate. The movement sequence of the knee protector plate is controlled by the knee protector plate being restrained at one edge on activation of the gas generator and the movement component attained thereby being maintained until the final position is attained. Due to swivelling of the knee protector plate a pocket is formed by the flexible wall in the region of the swivelled second edge, this pocket being subjected to the compressed gases generated by the gas generator, i.e. the knee protector plate already receives a force component oriented upwards before the knee protector plate is released from the base plate, and is moved as of activation of the gas generator in a defined path inclined upwards into its final position.

In one embodiment of the invention the first edge of the knee protector plate is retained behind a ledge fixedly arranged on the base plate. This ledge does not release the knee protector plate until the latter has executed a movement upwards in the direction of the second edge. Before the knee protector plate is released from the base plate it is already moved in the intended direction.

In a further embodiment of the invention a sail is provided within the volume defined by the flexible wall, the base plate and the knee protector plate, this sail being connected, on the one hand, to the base plate and, on the other, to the knee protector plate. On activation of the gas generator, a flow impinges on the sail in such a way that a pressure is exerted on the knee protector plate, after the first edge of the knee protector plate has been released from the base plate, this pressure causing the knee protector plate to move substantially parallel to its swivelled-out position and away from the base plate. Providing a sail within the volume permits even more precise control of the movement sequence of the knee protector plate during the complete inflation action.

In yet a further embodiment of the invention the sail defines a final position of the knee protector plate in the deployed condition of the wall together therewith, as a result of which the final position of the knee protector plate can be, on the one hand, adjusted more precisely and flexibly, and, on the other, this final position of the knee protector plate is stabilized by the additional anchoring of the sail. Any departure of the knee protector plate sideways or upwards or downwards on inclined impact of the knees of a vehicle occupant is prevented or restricted by this embodiment.

It is furthermore provided for that the base plate is connected to the vehicle structure via a mechanical deformation element. This deformation element offers, following the delay due to the gas volume, a second delay stage for the vehicle occupant. In the case of a heavy vehicle occupant or an impact at high velocity the deformation member thus makes a further delay path available and is able to offer an additional degree of protection in such cases.

Preferably the base plate consists of a frame plate connected to the vehicle structure and a mounting plate secured to the latter. In this arrangement the mounting plate mounts the gas generator. Such a configuration promotes a modular arrangement since various gas generators can be applied together with their mounting plate to an existing frame plate. The mounting plate may be secured to the frame plate by rivets, bolts or similar fasteners.

As another measure in a further embodiment of the invention the flexible wall is clamped in place along the first closed rim between frame plate and mounting plate. Securing the flexible wall to the base plate with sufficient tensile strength and pressure tightness is achieved by this measure in a simple and cost-effective way.

In accordance with yet another embodiment of the invention a profile ledge is mounted between frame plate and mounting plate, the flexible wall being secured to this profile ledge along the first closed rim. Employing a profile ledge facilitates attaching the flexible wall to the base plate. In this arrangement the profile ledge may be configured as an extrusion profile or as an injection molded item. Securing the flexible wall to the profile ledge can be done by stitching, bonding, molding or folding.

In accordance with an advantageous embodiment of the invention the second closed rim of the flexible wall is formed by a surrounding fold of the flexible wall. For connecting the second closed rim to the knee protector plate the latter comprises a surrounding beading encompassing the surrounding fold of the flexible wall. By encompassing a surrounding fold the flexible wall can be reliably secured to the knee protector plate without necessitating any complicated, pressure-tight fastening of an end rim of the flexible wall. By correspondingly configuring the surrounding fold and the beading, for instance, by a simple accumulation of the wall material, a reliable mounting in the surrounding beading can be achieved.

In still a further embodiment of the invention the second closed rim of the flexible wall is formed by inserting a reinforcement ring in the surrounding fold. The beading of the knee protector plate then encompasses the surrounding fold and the inserted reinforcement ring. Such an embodiment permits a highly loadable attachment of the knee protector plate to the flexible wail. By stitching the fold after having inserted the reinforcement ring the latter can be prevented from slipping out.

In conclusion it may be of advantage for the flexible wall to comprise a section surrounded by the second closed rim to form a bag, the opening of the latter being defined by the first closed rim of the flexible wall. Employing a bag-shaped wall may be of advantage in producing the knee restraint system by the fastening of the second closed rim to the knee protector plate not needing to be executed pressure-tight.

BRIEF DESCRIPTION OF THE DRAWINGS

Advantageous example embodiments of the invention are described in the following and illustrated in the drawing in which.

DESCRIPTION OF THE PREFERRED EMBODIMENTS

Figure 1:
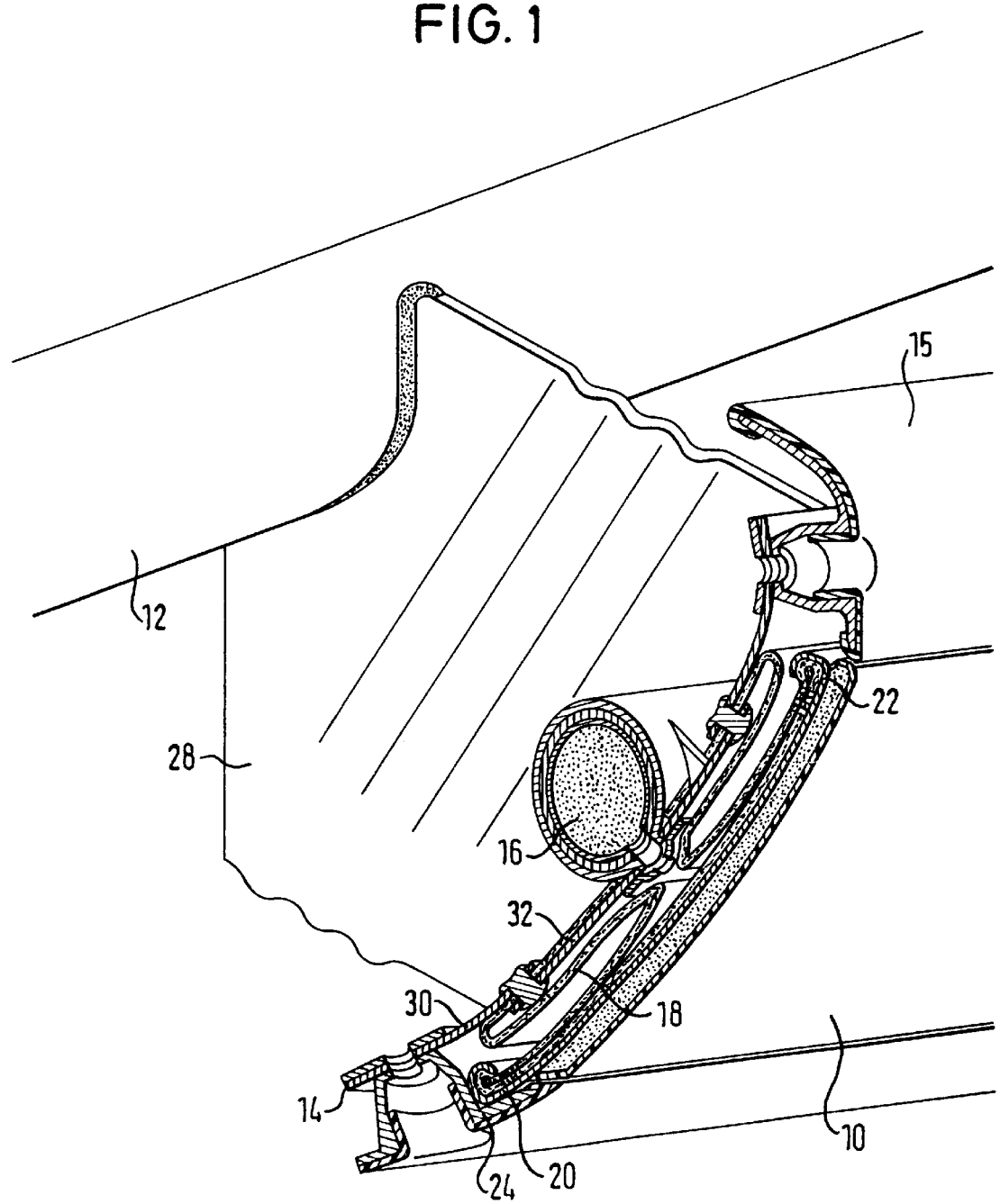
FIG. 1 is a perspective partial section view of a first knee restraint device in accordance with the invention shown in the resting condition.

In FIG. 1 a knee restraint device for vehicles is illustrated, comprising a knee protector plate 10 movable in the direction of the knees of a vehicle occupant. A base plate 14 is connected to the vehicle structure 12 via a mechanical deformation element 28. The base plate 14 comprises in its middle region an opening for inflowing compressed gases. A gas generator 16 is connected to the base plate 14 by the opening in the latter. In the resting condition of the knee restraint device depicted in FIG. 1 a flexible wall 18 is folded in place between the base plate 14 and the knee protector plate 10. The flexible wall is formed as a bag. A first lower edge 20 of the knee protector plate 10 is held swivably behind a ledge 24 which is in turn fixedly arranged on the base plate 14. A second upper edge 22 of the knee protector plate 10 is mounted by means of a predetermined breaking point, which is able to be torn out, of the cladding material on a section 15 of the inner cladding, this section being in turn fixedly connected to the base plate 14. On activation of the gas generator 16 the volume formed by the base plate 14, the flexible wall 18 and the knee protector plate 10 is filled with compressed gases, as a result of which the defeatable connection of the upper edge 22 of the knee protector plate 10 is torn out so that the latter swivels away from the base plate 14. The lower edge 20 of the knee protector plate 10 is retained behind the ledge 24 until the knee protector plate 10 has moved upwards. Such a movement of the knee protector plate 10 upwards occurs directly after the upper edge 22 of the knee protector plate 10 has become released since the upper section of the flexible wall 18 is now able to deploy under the influence of the compressed gases from the gas generator 16, producing a force directed upwards. Before the lower edge 20 of knee protector plate 10 is thus released from the ledge 24 and therefore from the base plate 14, it already experiences a movement directly upwards. As a result of this, the movement path of the knee protector plate 10 is initiated defined so that any uncontrolled movement of the knee protector plate 10 is avoided during the inflation action.

Figure 2:
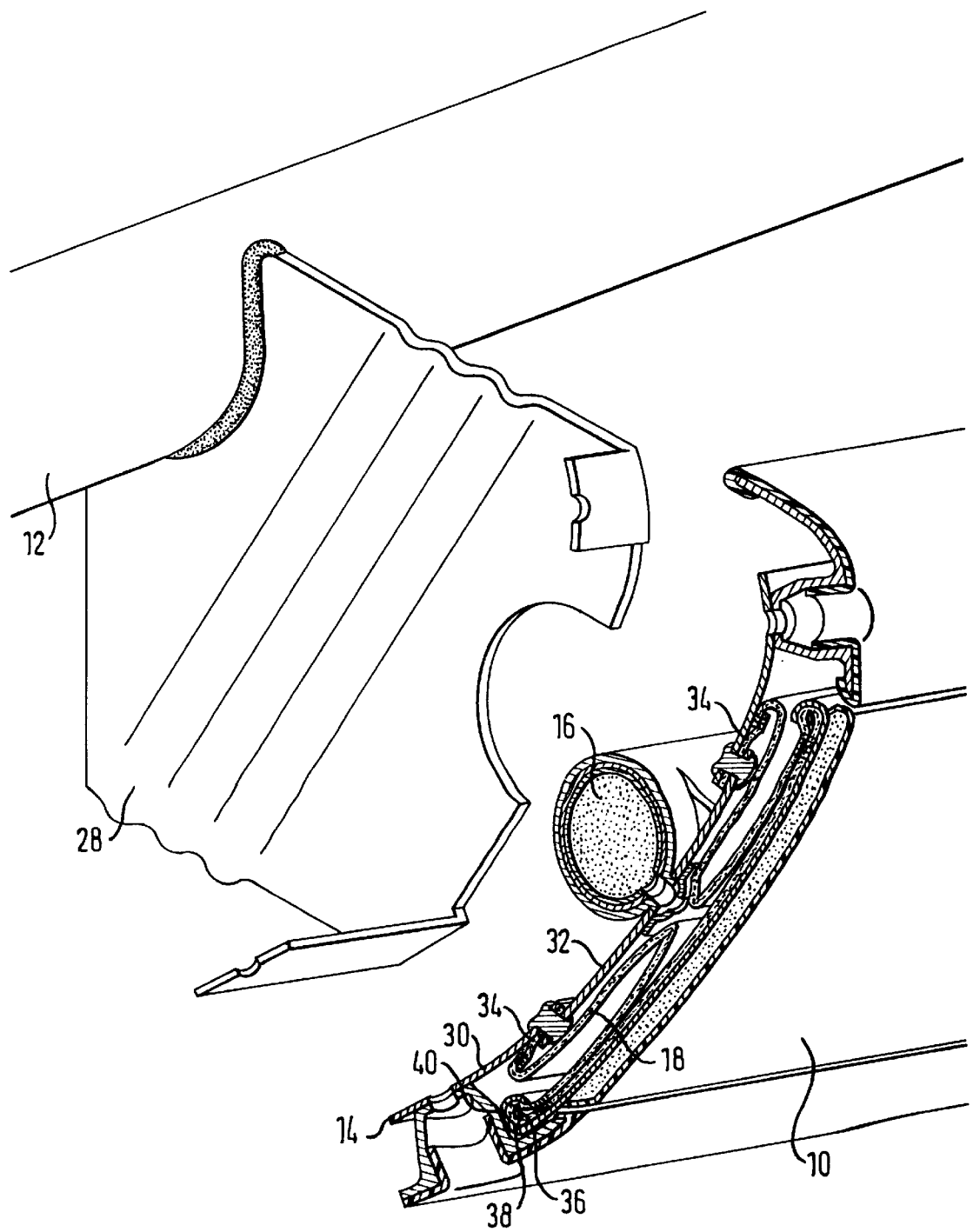
FIG. 2 shows a second embodiment of the invention prior to a sub-module being secured to a vehicle structure.
Figure 4:
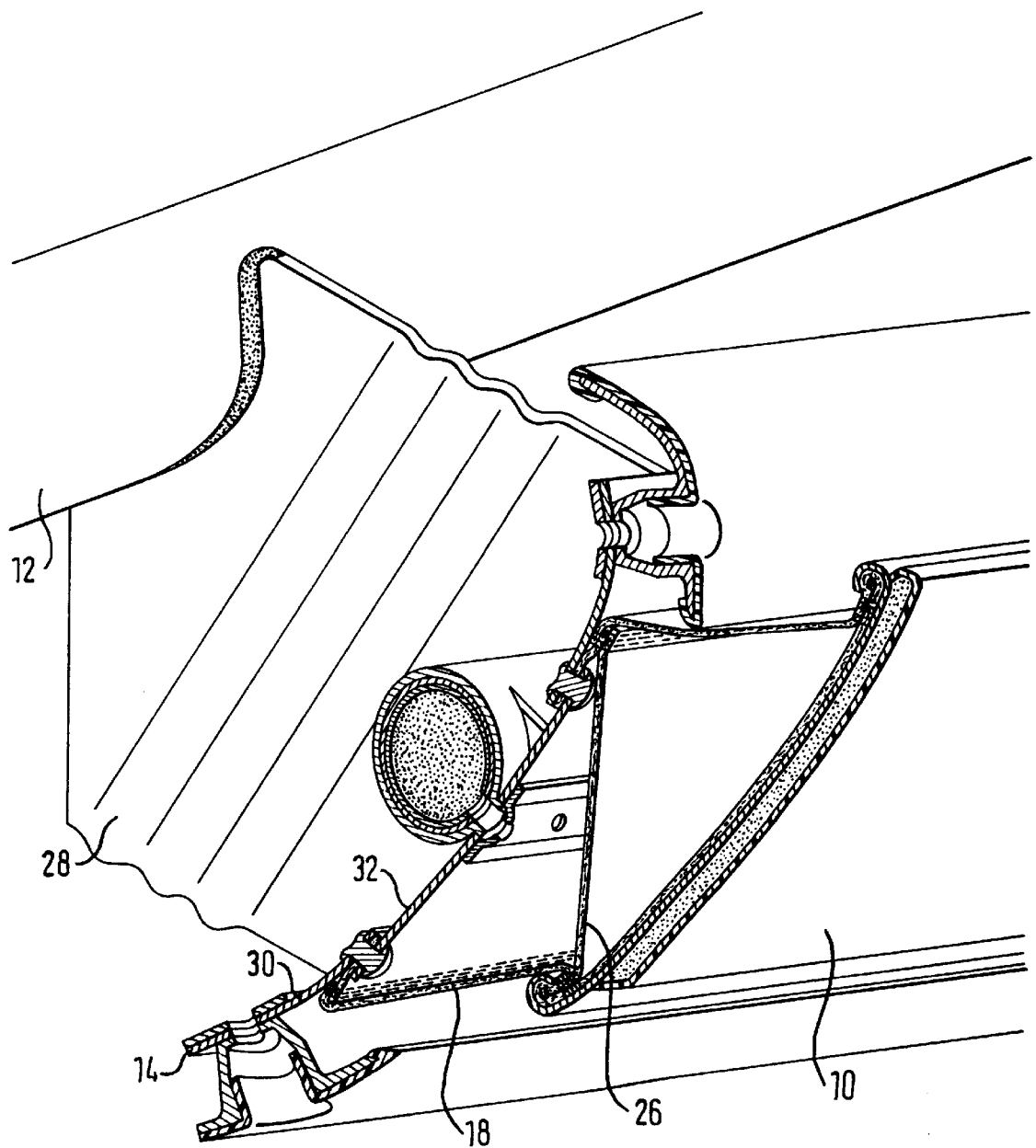
FIG. 4 is a perspective partial section view of the knee restraint device shown in FIG. 3 illustrated in the fully inflated condition.

FIG. 2 shows a further embodiment of the knee restraint device in accordance with the invention prior to a sub-module being secured to a mechanical deformation element 28 and thus to the vehicle structure 12. In this view the modular structure of the knee restraint device in accordance with the invention is clearly evident, this structure permitting optional vehicular equipment of the knee restraint device in accordance with the invention. The gas generator 16, the flexible wall 18 and the knee protector plate 10 are secured together with a section of the inner cladding to the base plate 14 and can be simply swapped or retrofitted as a module. The base plate 14 consists of a frame plate 30 and a mounting plate 32 connected to each other by rivets. Whilst the frame plate 30 is connected to the deformation element 28 and thus to the vehicle structure 12, the gas generator 16 is fastened to the mounting plate 32. To secure the flexible wall 18 along its first closed rim to the base plate 14 a profile ledge 34 is provided in this case, clamped in place between the frame plate 30 and the mounting plate 32. The flexible wall 18 is stitched to the profile ledge 34 and additionally clamped in place between the profile ledge 34 and the frame plate 30, thus producing by simple means a fastening which is pressure-tight and of high tensile strength. The second closed rim of the flexible wall 18, as shown in the embodiment of FIG. 4, is formed by a surrounding fold 38 of the flexible wall 18 into which a reinforcement ring 36 is inserted. To retain the reinforcement ring 36 in the fold 38 the surrounding fold 38 of the flexible wall 18 is stitched. The knee protector plate 10 comprises in turn a surrounding beading 40 encompassing the surrounding fold 38 and the inserted reinforcement ring 36.

Figure 3:
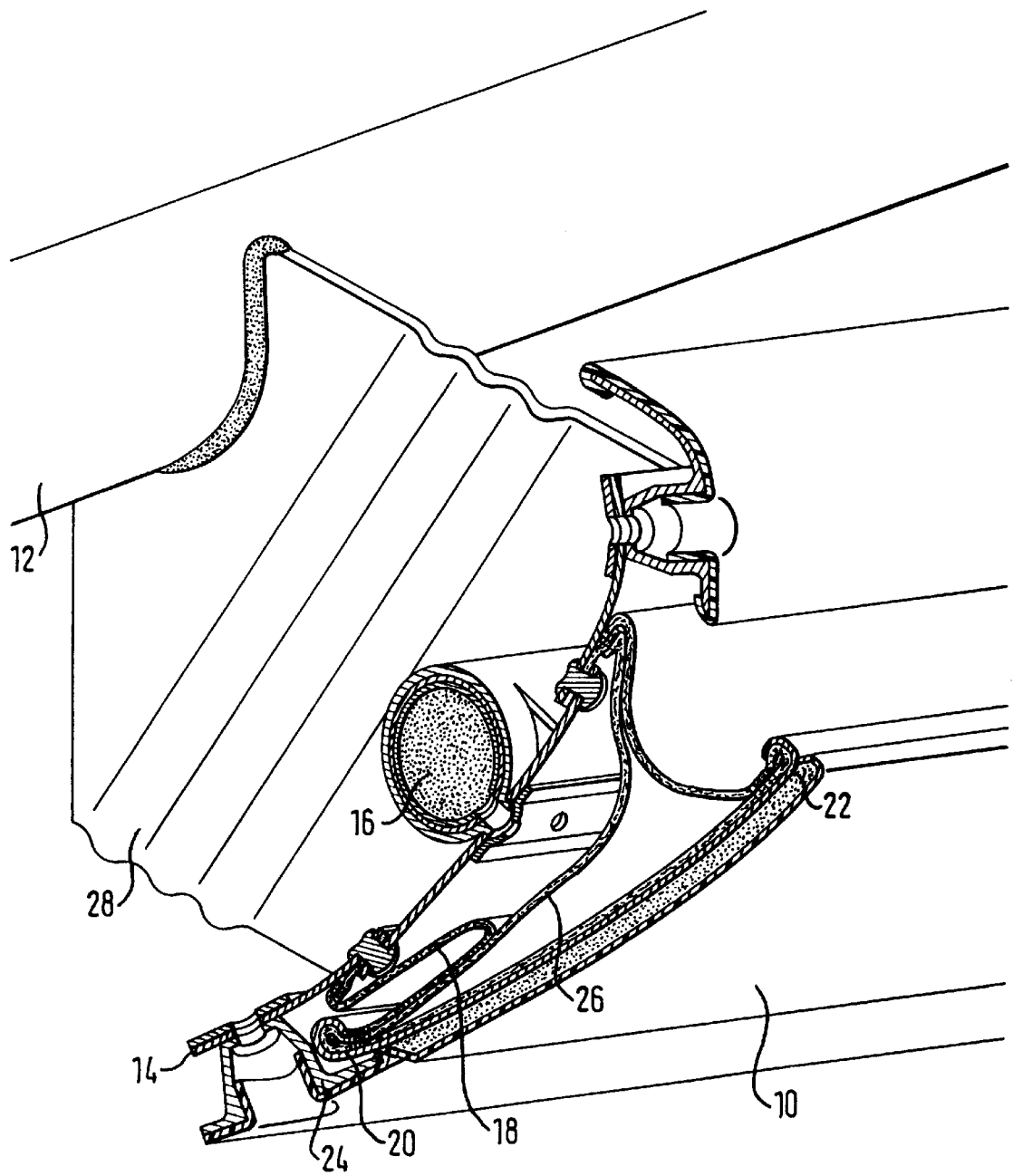
FIG. 3 is a perspective partial section view of a third preferred embodiment of the invention illustrated during inflation.

FIG. 3 shows a further advantageous embodiment of the knee restraint device in accordance with the invention, the knee protector plate 10 of which is illustrated in the partly swivelled-out condition. In this case, for better control of the movement path of the knee protector plate 10 during the inflation action a sail 26 is provided which is arranged within the volume formed by the base plate 14, the flexible wall 18 and the knee protector plate 10. The sail 26 should not extend over the whole width of the flexible wall 18 so as to be laterally connected to the wall because this would form a closed volume which would block the gas from reaching the knee protector plate. On activation of the gas generator 16 a flow impinges on the sail, caused by the compressed gases generated by the gas generator 16. Since the lower edge 20 of the knee protector plate 10 is held behind the ledge 24 the fastening, which is able to be torn out, of the upper edge 22 of the knee protector plate 10 is firstly released so that the knee protector plate is swivelled outwardly away from the base plate 14. Due to this swivel action of the knee protector plate 10 the upper section of the sail 26 is able to deploy and generate a force component oriented upwards due to the impinging flow of compresssed gases, as a result of which the knee protector plate 10 is drawn upwards so that the lower edge 20 is pulled out from behind the ledge 24. It is not until the ledge 24 has released the lower edge 20 that the latter is moved outwardly away from the base plate 14. Since the flow impinging on the sail 26 maintains the force component of the knee protector plate 10 oriented upwards up to the final position, the movement path of the knee protector plate 10 is predetermined during the inflation action from activation of the gas generator 16 up to achieving the final position of the knee protector plate 10.

FIG. 4 shows the knee restraint device of FIG. 3 in the inflated condition in which the knee protector plate 10 has attained its final position. The overpressure existing within the volume now results in the flexible wall 18 and the sail 26 being tensioned. In its now tensioned condition the sail 26 together with the flexible wall 18 defines the final position of the knee protector plate 10. In this arrangement the final position shown in FIG. 3 is located clearly above the starting position of the knee protector plate 10 in the resting condition of the knee restraint device and is defined by the cut of the flexible wall 18 and the cut of the sail 26. In addition, the tensioned sail 26 also stabilizes the knee protector plate 10 in its final position to prevent any departure of the knee protector plate sidewards, upwards or downwards on knee impact of a vehicle occupant.

Depending on how and where the knee restraint device in accordance with the invention is incorporated in the vehicle a slanting downwards movement of the knee protector plate may be needed. This can be easily achieved in the invention, by the upper edge of the knee protector plate being restrained relative to the lower edge. Analogously to the embodiments as described the knee protector plate is then first released along its upper edge from the base plate as soon as it experiences a force component oriented downwards.

What is claimed is:

1. A knee restraint device for vehicles, comprising:
   a knee protector plate movable in the direction of the knees of a vehicle occupant,
   a gas generator,
   a base plate connectable to a vehicle structure having at least one opening for connection to said gas generator,
   a wall of flexible material with a first closed rim and a second closed rim,
   said wall being folded between said base plate and said knee protector plate in a resting condition and being connected along said first closed rim to said base plate and along said second closed rim to said knee protector plate,
   said knee protector plate having a first edge oriented in a vehicle transverse direction and a second edge located opposite said first edge,
   said first edge being held swivable and releasable on said base plate, and
   defeatable fastening means for securing said second edge to said base plate,
   said flexible wall expanding in response to an increase in pressure upon activation of said gas generator, and
   wherein, when said flexible wall expands, said defeatable fastening means releases, such that further expansion of the flexible wall causes said knee protector plate to swivel about its first edge, whereby still further expansion causes said first edge to release from the base plate.

2. The knee restraint device as set forth in claim 1, wherein said base plate has a ledge fixedly arranged thereon, said first edge of said knee protector plate being held between said base plate and said ledge.

3. The knee restraint device as set forth in claim 1, further comprising a sail having a first rim and a second rim, said sail being arranged within a volume defined by said flexible wall, said base plate and said knee protector plate, said first rim of said sail being connected to said base plate and said second rim of said sail being connected to said knee protector plate,, so that on activation of said gas generator a flow impinging on said sail exerts a pressure on said knee protector plate after said first edge of said knee protector plate has been released from said base plate, said pressure causing said knee protector plate to move substantially parallel to its swiveled-out position and away from said base plate.

4. The knee restraint device as set forth in claim 1, wherein said flexible wall is formed as a bag, an opening of said bag being defined by said first closed rim.

5. The knee restraint device as set forth in claim 3, wherein said sail defines a final position of said knee protector plate in a deployed condition of said wall.

6. The knee restraint device as set forth in claim 1, wherein said base plate is connected to said vehicle structure via a mechanical deformation element.

7. The knee restraint device as set forth in claim 1, wherein said base plate is provided with a frame plate connected to said vehicle structure and a mounting plate secured to said vehicle structure, said mounting plate mounting said gas generator.

8. The knee restraint device as set forth in claim 7, wherein said flexible wall is clamped in place along said first closed rim between said frame plate and said mounting plate.

9. The knee restraint device as set forth in claim 7, wherein a profile ledge is mounted between said frame plate and said mounting plate, said flexible wall being secured to said profile ledge along said first closed rim.

10. The knee restraint device as set forth in claim 1, wherein said second closed rim of said flexible wall is formed by a surrounding fold of said flexible wall and said knee protector plate is provided with a surrounding beading encompassing said surrounding fold of said flexible wall.

11. The knee restraint device as set forth in claim 10, wherein a reinforcement ring is inserted in said surrounding fold of said flexible wall and said beading of said knee protector plate encompasses said surrounding fold and said inserted reinforcement ring.

* * * * *